J. F. CRAVEN.
METHOD OF ELECTRIC WELDING.
APPLICATION FILED MAR. 5, 1909.
977,711.
Patented Dec. 6, 1910.
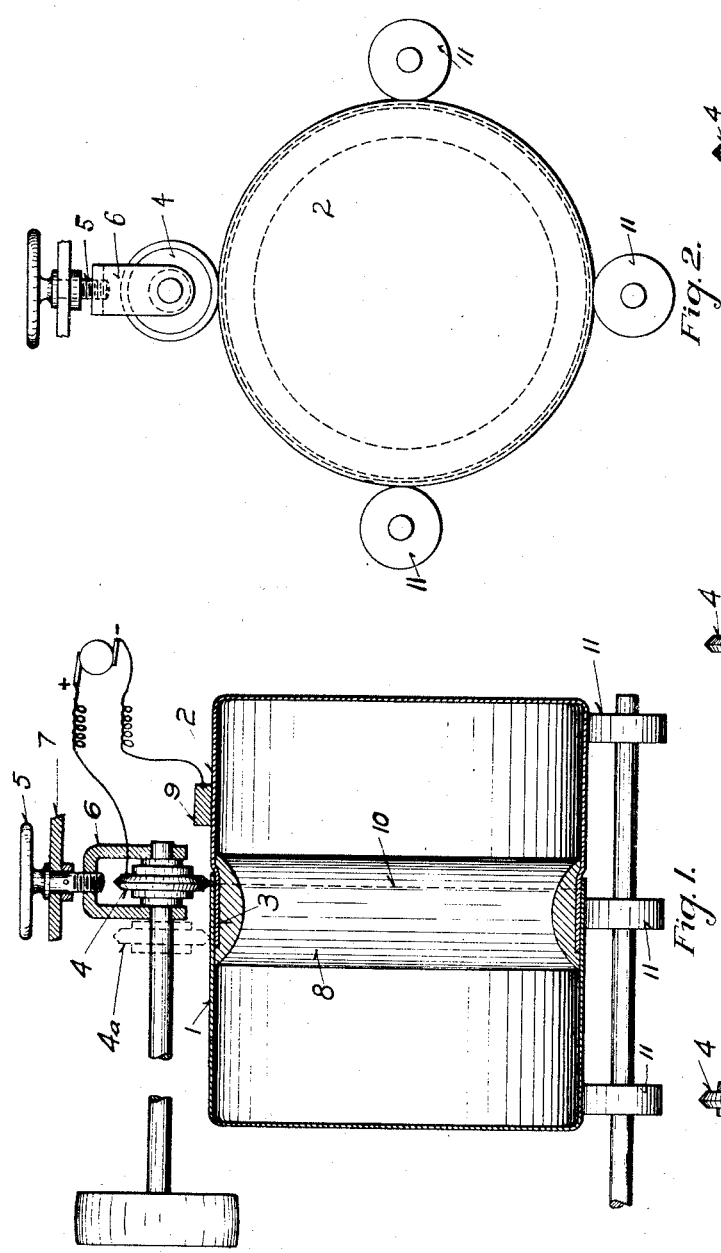
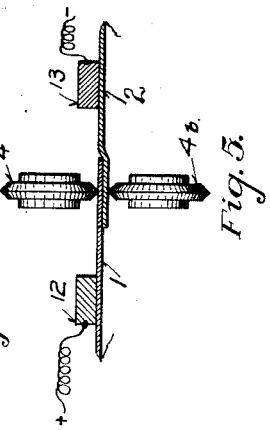
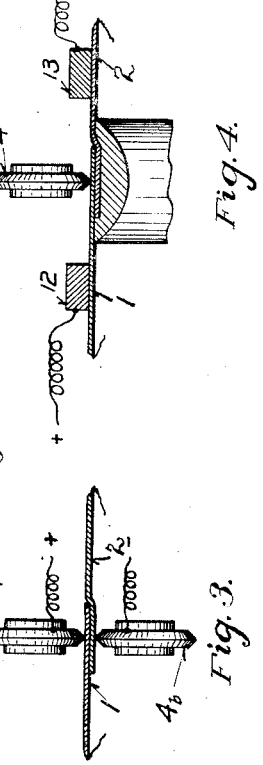
WITNESSES
Stephen Wach
Marie Draper
INVENTOR
James F. Craven
By Fred'k H. Winters,
Attorney

UNITED STATES PATENT OFFICE.

JAMES F. CRAVEN, OF PITTSBURG, PENNSYLVANIA.

METHOD OF ELECTRIC WELDING.

977,711.  Specification of Letters Patent.  Patented Dec. 6, 1910.

Application filed March 5, 1909. Serial No. 481,492.

*To all whom it may concern:*

Be it known that I, JAMES F. CRAVEN, a resident of Pittsburg, in the county of Allegheny and State of Pennsylvania, have invented a new and useful Improvement in Methods of Electric Welding, of which the following is a specification.

This invention relates to a process of electric welding, and more particularly to a process of electrically welding together thin metal sheets or plates, or parts of articles formed from thin metal sheets or plates.

The object of the invention is to expeditiously and securely form a lap-weld in articles of the kind specified.

Generally stated the invention consists in progressively carrying along the overlapping portions of the plates or sheets a suitable pressure device having a narrow contacting portion to thereby press the sheets into close contact along a line and produce a line of low conductivity, and simultaneously therewith passing through said line of contact an electric current to fuse and weld the sheets.

In the accompanying drawings Figure 1 is a diagrammatic sectional view illustrating the application of the method to welding together two tubular sheet metal pieces, such as sections of sheet metal barrels or cans; Fig. 2 is an end view of the same; Fig. 3 illustrates a modification whereby pressure rollers are applied to both sides of the sheets, or the application of the method to flat sheets; and Figs. 4 and 5 are similar views showing modifications.

In carrying out the method the sheets or plates to be welded are first overlapped, one of said sheets being indicated by the numeral 1, and the other by the numeral 2 with the overlapping part shown at 3. Preferably one of the sheets is off-set as indicated in the drawings to leave one face of the united sheets substantially flat. The weld is made by progressively carrying along said overlapping portion a pressure device, preferably in the form of a roller 4, having a thin or narrow contact face formed either by bevels as shown in the drawing, or by so rounding the same as to form a comparatively sharp periphery, and applying pressure to said roller in a manner to cause the same to press the sheets firmly together along a line, and simultaneously therewith passing a current through said line of close contact and fusing and welding the metal.

Fig. 1 shows the invention applied to welding together two cylindrical sheet metal parts to form a barrel, cask or can, in which only a single pressure roller 4 is shown acting on the outside. This roller is shown so mounted that it can be pressed against the sheets such as by a screw 5 acting against the bearings 6 and mounted in support 7. To give the necessary support or resistance to the pressure of the roller 4, I provide a strong ring 8 inside of the tubular article which is intended to remain therein and form an internal strengthening band or ring. It is obvious that if one of the members to be welded is of sufficient thickness to possess the required rigidity the ring 8 could be dispensed with. The current in this case is supplied by making the roller 4 one terminal of the circuit and connecting the opposite terminal 9 to the plate 2. The roller is progressively carried along the lap joint by either driving the roller or by rotating the tubular article, as indicated in Fig. 2. Carrying rolls or wheels 11 support the tubular article rotatively and also oppose the welding roller 4.

It is of course well known that thin metal sheets do not normally lie in close contact, but by means of the sharp edged pressure roller 4 such sheets are pressed firmly together along a narrow line, indicated at 10, which forms a path of high conductivity through which the current will pass, and since the contact is on a line only, the current is concentrated and a high degree of heat is produced by a small current which almost instantly fuses the metal and produces the weld. The confinement of the pressure to a line makes it possible to use a small current and still obtain the necessary heat to fuse the metal. The method therefore is very economical. If it is desired to produce more than a single line of weld an additional roller $4^a$ may be applied on the same shaft with roller 4, as indicated in dotted lines in Fig. 1.

Fig. 3 shows a modification in which contact rollers 4 and $4^b$ are shown on opposite sides of the thin sheets, this being the method followed in case the supporting or stiffening ring 8 is to be dispensed with. The arrangement shown in Fig. 3 can be employed for welding either tubular sheet metal members, one or both of which have open ends, or flat sheet metal members.

Fig. 4 shows a modification of the arrangement of Fig. 1 and in which the roller 4 acts merely as the pressure means for pressing the sheets together along a line, the current in this instance being supplied by separate contact devices which may be in the form of brushes, rolls or other means, indicated at 12 and 13. Fig. 5 shows the same modification applied to welding flat sheets by pressure rolls 4 and 4$^b$, and current conducting devices 12 and 13.

In all applications of the method the weld is made along a line only, but is made in a progressive manner. The current is so concentrated at the line that the weld is made almost instantaneously, and consequently the progressive movement of the pressure or pressure and contact rollers can be quite rapid so that sheets of large tubular articles can be welded together very rapidly. The method is rapid and economical. The welding is effected of course entirely by fusion and pressure, producing what is known as autogenous weld.

What I claim is:

1. The method of electrically welding sheets or thin plates consisting in overlapping said sheets or plates and progressively pressing the overlapping portions thereof firmly together along a line so narrow as to force the sheets into intimate contact to form a good path of conductivity for the current and to concentrate the current to produce a high degree of heat, and simultaneously therewith passing an electric current from plate to plate at said line and fusing the metal and producing the weld.

2. The method of electrically welding sheets or thin plates consisting in overlapping said sheets or plates and progressively pressing the overlapping portions of the sheet firmly together by rolling pressure along a line so narrow as to force the sheets into intimate contact to form a good path of conductivity for the current and to concentrate the current to produce a high degree of heat, and simultaneously therewith passing an electric current from plate to plate at said line and fusing the metal and producing the weld.

3. The method of electrically welding sheets or thin plates consisting in overlapping said sheets or plates and by means of properly shaped electrical terminals progressively pressing the overlapping portions firmly together along a line so narrow as to force the sheets into intimate contact to form a good path of conductivity for the current and to concentrate the current to produce a high degree of heat, and simultaneously therewith passing an electric current from plate to plate at said line and fusing the metal and producing the weld.

4. The process of electrically welding sheets or thin plates consisting in overlapping said sheets or plates and by means of properly shaped rolling electrical terminals progressively pressing the overlapping portions together along a line so narrow as to force the sheets into intimate contact to form a good path of conductivity for the current and to concentrate the current to produce a high degree of heat, and simultaneously therewith passing an electric current from plate to plate at said line and fusing the metal and producing the weld.

5. The method of electrically welding overlapping tubular sheets or thin plates, consisting in applying a stiffening ring inside of the overlapping portions, and then progressively pressing said overlapping portions into close contact along a line, and simultaneously therewith passing an electric current from plate to plate and thereby fusing the metal and producing the weld.

6. The method of electrically welding overlapping tubular sheets or thin plates, consisting in applying a stiffening ring inside of the overlapping portions, and then progressively pressing the overlapping portions into firm contact along a line by means of a properly shaped electrical terminal, thereby producing a line of conductivity and fusing the metal and producing the weld.

7. The method of electrically welding overlapping tubular sheets or thin plates, consisting in applying a stiffening ring inside of the overlapping portions, and then progressively pressing the overlapping portions together along a narrow line by means of a properly shaped rolling electrical terminal, thereby producing a line of conductivity and fusing the metal and producing the weld.

In testimony whereof, I have hereunto set my hand.

JAMES F. CRAVEN.

Witnesses:
 JOHN S. CORT,
 F. W. WINTER.